US009635517B2

United States Patent
Guo et al.

(10) Patent No.: US 9,635,517 B2
(45) Date of Patent: Apr. 25, 2017

(54) IDENTIFICATION OF LOCATION OF A TARGET ADDRESS USING POSITION INFORMATION TRANSMITTED BY POSITION IDENTIFYING TRANSMITTER IN VICINITY OF TARGET ADDRESS

(71) Applicant: GLOBALFOUNDRIES INC., Grand Cayman (KY)

(72) Inventors: Shang Q. Guo, Cortland Manor, NY (US); Canturk Isci, Secaucus, NJ (US); Jonathan Lenchner, North Salem, NY (US); Maharaj Mukherjee, Poughkeepsie, NY (US); Emmanuel Tong-Viet, Montpellier (FR)

(73) Assignee: GLOBALFOUNDRIES INC., Grand Cayman (KY)

( * ) Notice: Subject to any disclaimer, the term of this patent is extended or adjusted under 35 U.S.C. 154(b) by 556 days.

(21) Appl. No.: 13/930,158

(22) Filed: Jun. 28, 2013

(65) Prior Publication Data

US 2015/0006076 A1  Jan. 1, 2015

(51) Int. Cl.
*G06F 13/40* (2006.01)
*H04W 4/04* (2009.01)
*G01C 21/36* (2006.01)

(52) U.S. Cl.
CPC .......... *H04W 4/046* (2013.01); *G01C 21/362* (2013.01)

(58) Field of Classification Search
None
See application file for complete search history.

(56) References Cited

U.S. PATENT DOCUMENTS

| 6,195,039 | B1 * | 2/2001 | Glass, Jr. | .............. B63C 9/0005 342/357.75 |
| 7,167,095 | B2 * | 1/2007 | Carrender | .............. G01C 21/20 340/539.13 |
| 7,383,125 | B2 | 6/2008 | Silva et al. | |
| 8,031,120 | B2 | 10/2011 | Smith et al. | |
| 8,320,932 | B2 | 11/2012 | Pinder et al. | |

(Continued)

FOREIGN PATENT DOCUMENTS

WO  2008019883  2/2008

OTHER PUBLICATIONS

Hightower et al., "Location Systems for Ubiquitous Computing," Computer 34, No. 8 (2001): 57-66.

(Continued)

*Primary Examiner* — Ilwoo Park
*Assistant Examiner* — Juanito Borromeo
(74) *Attorney, Agent, or Firm* — Scully Scott Murphy and Presser; Frank DiGiglio

(57) ABSTRACT

Methods and apparatus are provided for navigating a vehicle to a target address using position information transmitted by a position identifying transmitter in a vicinity of the target address. A location of a target address is determined by receiving position information for the target address, upon entry of a searching vehicle in search of a target address into a vicinity of the target address, wherein the received position information for the target address is based upon position information transmitted by a position identifying transmitter located in the vicinity of the target address; and generating a navigation route to direct the searching vehicle to the target address using the received position information.

20 Claims, 4 Drawing Sheets

(56) References Cited

U.S. PATENT DOCUMENTS

| | | |
|---|---|---|
| 8,330,649 B2 | 12/2012 | Menouar et al. |
| 2008/0243378 A1 | 10/2008 | Zavoli |
| 2009/0093259 A1* | 4/2009 | Edge ..................... H04H 60/65 |
| | | 455/456.3 |
| 2011/0122019 A1* | 5/2011 | Lee ....................... G01S 5/0231 |
| | | 342/357.25 |
| 2012/0146812 A1* | 6/2012 | Ruy ...................... G08G 1/164 |
| | | 340/905 |

OTHER PUBLICATIONS

Ma, "Integration of GPS and Cellular Networks to Improve Wireless Location Performance," Proceedings of ION GPS/GNSS. 2003.
Capkun et al., "GPS-free positioning in mobile ad hoc networks," Cluster Computing 5.2 (2002).
Locationlogic Autodesk. "Autodesk® LocationLogic: A Technical Overview." www.autodesk.com/locationservices.
Boukerche et al., "Vehicular Ad Hoc Networks: A New Challenge for Localization-Based Systems," Computer communications 31.12 (2008): 2838-2849.

* cited by examiner

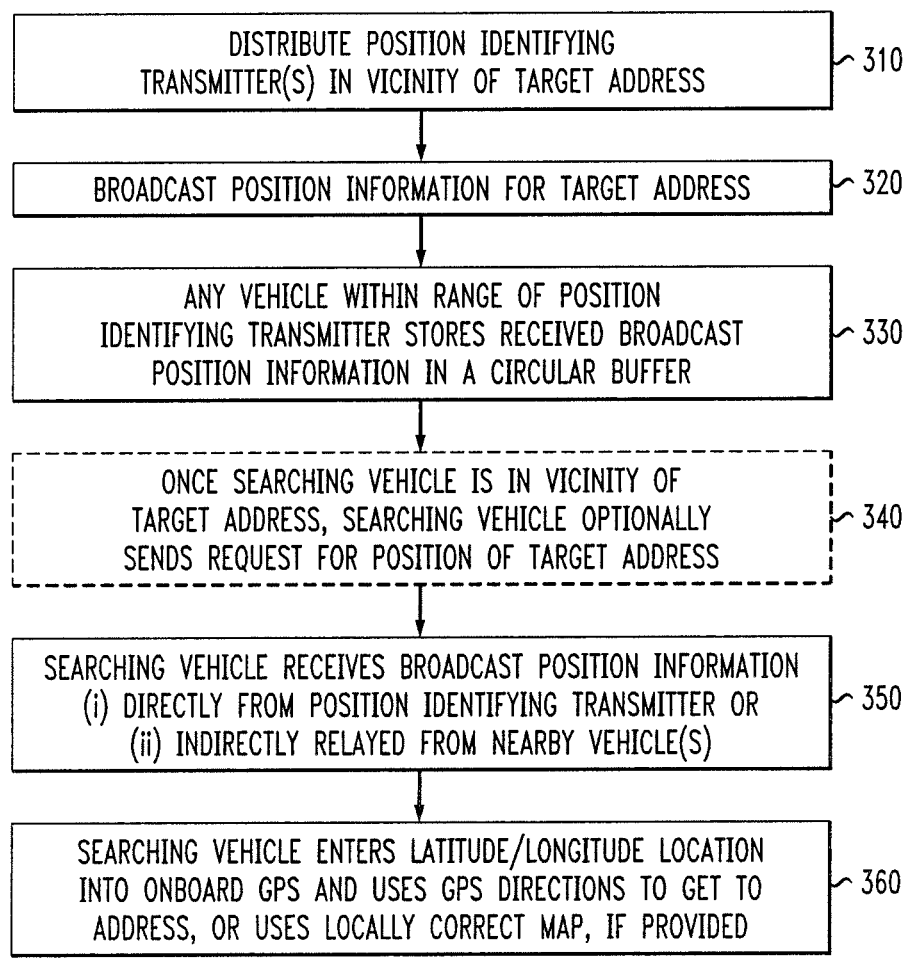

IDENTIFICATION OF LOCATION OF A
TARGET ADDRESS USING POSITION
INFORMATION TRANSMITTED BY
POSITION IDENTIFYING TRANSMITTER IN
VICINITY OF TARGET ADDRESS

FIELD OF THE INVENTION

The present invention relates generally to the electrical, electronic and computer arts, and, more particularly, to navigation techniques for navigating a vehicle to a target address.

BACKGROUND OF THE INVENTION

Navigation systems help vehicles and other vessels navigate to a desired destination and provide other navigation-related functions and features. For example, navigation systems typically evaluate various potential routes between a current or originating location and a desired destination and then recommend a particular route. A navigation system may then provide information about the optimum route, such as the turn-by-turn directions required to reach the destination. Navigation systems typically present a map to the user outlining the currently recommended route, the various turns required along the route, and, sometimes, the location of various features and points of interest along the route, such as gas stations, public transportation, emergency facilities, restaurants, hotels, and other businesses.

Navigation systems typically process a large database of roads and other geographic data to provide such functionality. The geographic data may comprise, for example, road locations, road limitations, such as turn restrictions and one way streets, address ranges for roads and information about points of interests.

While navigation systems have greatly improved the information that is readily available to a user and the ability to navigate to a desired location, they suffer from a number of limitations, which if overcome, could further improve their utility and reliability. For example, the geographic data that is processed by navigation systems may not be as accurate or up-to-date as more highly detailed maps. Thus, the maps and geographic information can be significantly different than the actual environment. This may be due, in part, to new construction or a reconfiguration of existing roads, which may not be reflected in the geographic databases for some time.

A need therefore exists for improved techniques for navigating a vehicle to a target address. A further need exists for more reliable navigation techniques that are resilient to imperfections in available geographic databases.

SUMMARY OF THE INVENTION

Generally, methods and apparatus are provided for navigating a vehicle to a target address using position information transmitted by a position identifying transmitter in a vicinity of the target address. According to one aspect of the invention, a location of a target address is determined by receiving position information for the target address, upon entry of a searching vehicle in search of a target address into a vicinity of the target address, wherein the received position information for the target address is based upon position information transmitted by a position identifying transmitter located in the vicinity of the target address; and generating a navigation route to direct the searching vehicle to the target address using the received position information. The transmitted position information can be received by the searching vehicle directly from the position identifying transmitter or indirectly from one or more nearby vehicles that individually obtain address information from position transmitters that the nearby vehicles come in proximity to and relay the information to passing vehicles to form a relay network. The transmitted position information for the target address comprises, for example, latitude/longitude coordinates for the target address and/or a localized map including the target address.

A vehicle that has obtained position information for the target address can optionally deposit the obtained position information into an address depot from which the deposited position information can be obtained by the searching vehicle. The disclosed navigation techniques can optionally be integrated into a navigation system in the searching vehicle.

A more complete understanding of the present invention, as well as further features and advantages of the present invention, will be obtained by reference to the following detailed description and drawings.

BRIEF DESCRIPTION OF THE DRAWINGS

FIG. 2 illustrates an exemplary data record for recording position information in accordance with aspects of the present invention;

FIGS. 3 and 4 are flow charts describing exemplary implementations of alternative navigation processes incorporating aspects of the invention.

DETAILED DESCRIPTION OF PREFERRED EMBODIMENTS

Aspects of the present invention provide techniques for navigating a vehicle to a target address using position information transmitted by a position identifying transmitter in the vicinity of a target address. The position identifying transmitter transmits position information comprising, for example, latitude/longitude coordinates of the target address and/or a correct localized map including the target address. The transmitted position information is used to generate a navigation route to direct a vehicle in search of the target address to the target address. The searching vehicle may receive the transmitted position information directly from a position identifying transmitter or indirectly from one or more nearby vehicles that obtain address information from the position transmitter(s) that they come in proximity to and relay this information to passing vehicles to form a relay network.

Figure 1:
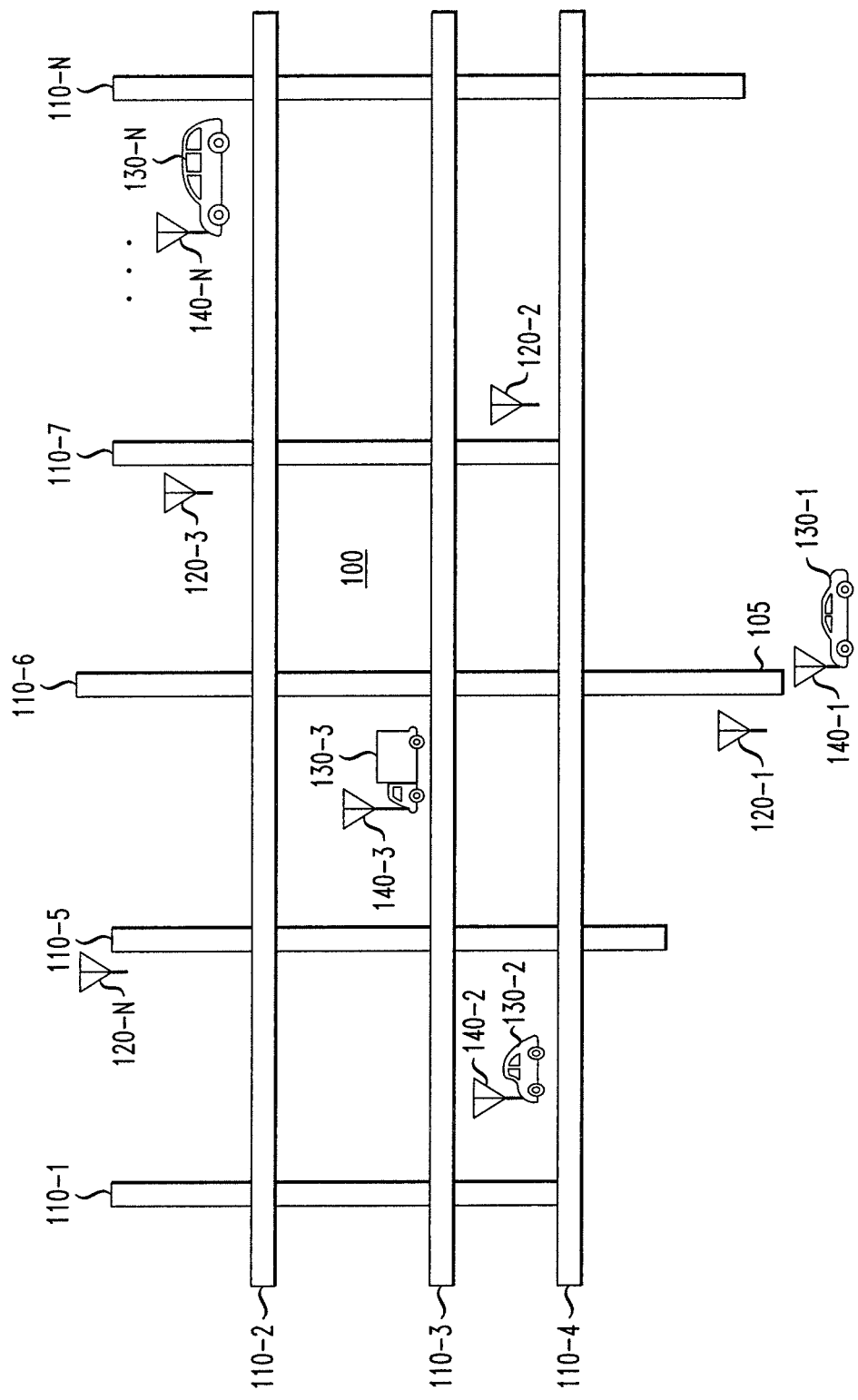
FIG. 1 illustrates an exemplary neighborhood region associated with the vicinity of a target address.

FIG. 1 illustrates an exemplary neighborhood region 100 associated with the vicinity of a target address. As shown in FIG. 1, the exemplary neighborhood region 100 comprises an entrance 105 to the neighborhood region 100, as well as a plurality of roads 110-1 through 110-N. According to one aspect of the invention, a position identifying transmitter 120-1 through 120-N is associated with each target address. For example, the position identifying transmitter may be associated with (e.g., positioned on) a mail box, a building associated with the target address, a number tag associated with the target address, near an entrance to a neighborhood containing the target address and/or be embodied as an Access Point already associated with the target address.

In this manner, as one or more vehicles 130-1 through 130-N enter the vicinity of the neighborhood region 100, they will receive position information for the target address that is received directly or indirectly from a position identifying transmitter 120 located in the vicinity of the target address.

As shown in FIG. 1, one or more vehicles 130 have an associated vehicle relay network transceiver 140 to communicate with one another over a short range relay or low-power mesh network where vehicles 130 can communicate with one another at relatively close range using vehicle-to-vehicle communications. For example, the vehicles 130 may each contain an antenna 140-1 through 140-N to enable short range communication over Wi-Fi, or even shorter range communication via Bluetooth, infrared wireless, ultra-wideband, or induction wireless. See e.g., http://www.ehow.com/list_7361719_bluetooth-alternatives.html. In this manner, messages can be passed from one vehicle 130 to another vehicle 130.

FIG. 2 illustrates an exemplary data record 200 for recording position information that is employed by aspects of the present invention. The exemplary data record 200 may be employed by a position identifying transmitter 120 to contain the position information that is transmitted for a target address. The information in the exemplary data record 200 may be transmitted, for example, as a line of text, such as Address="1101 Kitchawan Road, Yorktown Heights, N.Y. 10598", latitude="41.2708N", longitude="73.7781W." When the transmitted information is received by a vehicle 130, in anticipation of possible requests for address information from additional vehicles, the vehicle 130 may store the entry in a circular buffer. As shown in FIG. 2, an exemplary data record 200 indicates a given target address and the corresponding latitude/longitude coordinates for the target address.

FIG. 3 is a flow chart describing an exemplary implementation of a navigation process 300 incorporating aspects of the invention. As shown in FIG. 3, the exemplary navigation process 300 initially distributes one or more position identifying transmitter(s) 120 in a vicinity of the target address during step 310. As indicated above, the position identifying transmitter(s) 120 may be attached, for example, to mail boxes, building number tags, near the entrance to a neighborhood, or may be embodied as an existing Access Point at the target address.

The position information, such as latitude/longitude coordinates, for the target address, is broadcast by the position identifying transmitter(s) 120 during step 320, for example, over an RF channel having a range of approximately 150-300 feet. Any vehicle 130 within range of a position identifying transmitter(s) 120 stores the received broadcast position information into a circular buffer during step 330.

Once a searching vehicle 130 enters a vicinity of the target address, the searching vehicle 130 can optionally send a request for a position of the target address during step 340.

The searching vehicle 130 receives the broadcast position information during step 350, either (i) directly from a position identifying transmitter 120 or (ii) indirectly relayed from nearby vehicle(s) using an associated vehicle relay network transceiver 140.

The searching vehicle 130 then enters the received position information, such as the latitude/longitude coordinates of the target address into an onboard GPS during step 360 and uses the GPS directions to get to the target address.

Alternatively, if the received position information comprises a locally correct map, this information is used during step 360.

Figure 4:
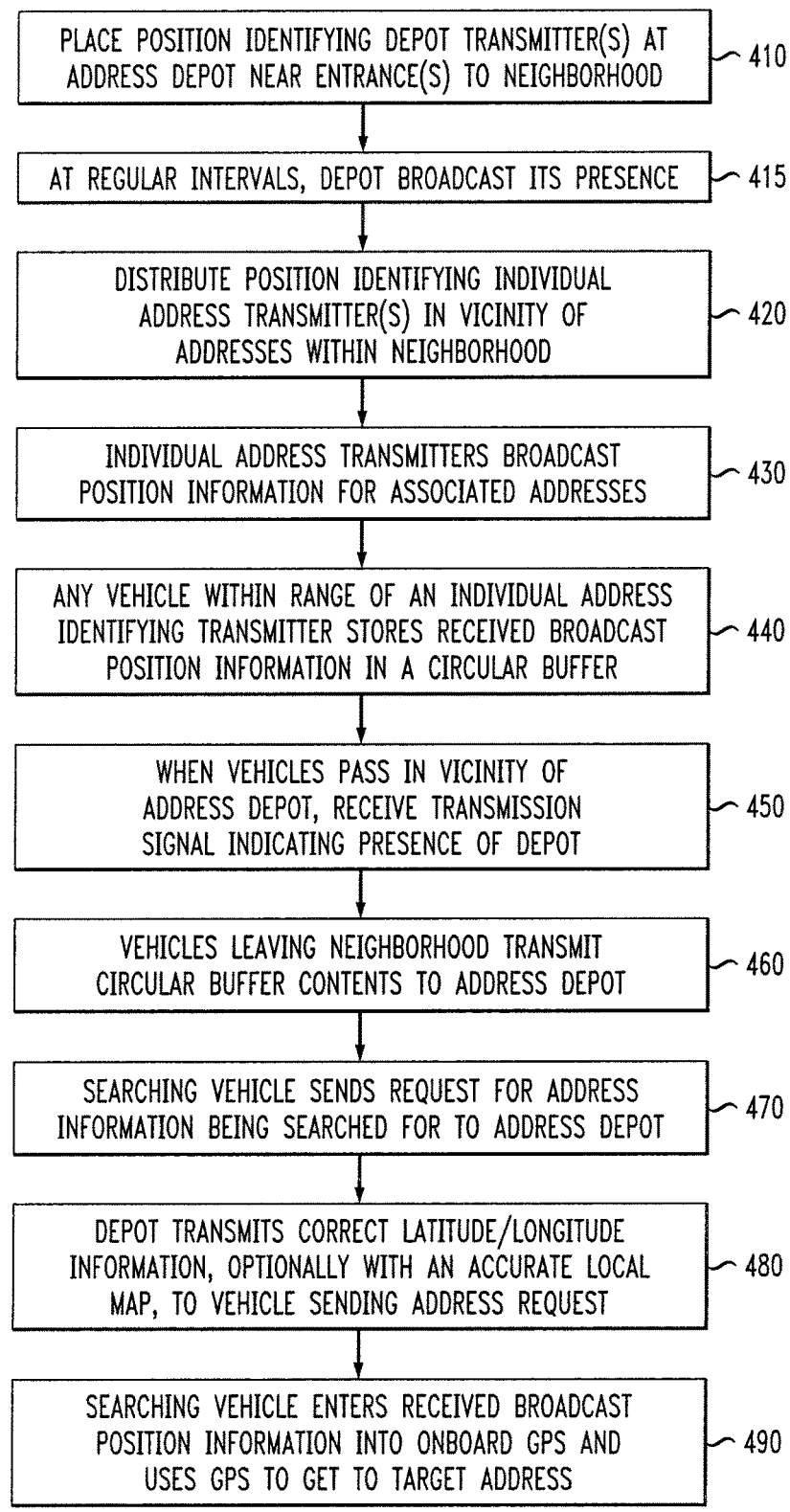

FIG. 4 is a flow chart describing an exemplary implementation of an alternate navigation process 400 incorporating aspects of the invention. As shown in FIG. 4, the exemplary navigation process 400 places position identifying transmitter(s) 120 at an address depot near entrance(s) to a vicinity of the target address during step 410, such as an entrance to a neighborhood containing the target address, at an exit ramp from a highway that provides access to the target address, or at a construction site in a vicinity of the target address to provide detour information or information about a new road configuration.

The position information in an address depot near the entrance to a neighborhood may be administered, for example, by a neighborhood association. Likewise, and the position information in an address depot near an exit ramp or a construction site may be administered, for example, by a government entity, highway authority or construction company. In one exemplary variation, position information may be dynamically stored in an address depot by nearby vehicles 130 that have captured correct address information into their circular buffers. In this manner, the depot obtains the correct locations of many nearby addresses over time.

As shown in FIG. 4, at regular intervals, the address depot(s) broadcast its (their) presence during step 415. In addition, individual position identifying address transmitter(s) 120 are positioned in the vicinity of addresses within the neighborhood during step 420.

The individual address transmitter(s) 120 broadcast position information for their associated addresses during step 430. Any vehicle 130 that is within range of an individual address identifying transmitter 120 stores the received broadcast position information in a circular buffer during step 440.

When vehicles 130 pass in the vicinity of an address depot, the passing vehicles 130 receive the transmission signal indicating the presence of the depot, during step 450. Vehicles leaving the neighborhood can then transmit the contents of their circular buffer (e.g., address information) to the address depot during step 460. Upon entry of a searching vehicle 130 in search of a target address into the neighborhood, the searching vehicle 130 sends a request for address information being searched for to the address depot during step 470. The depot then transmits correct latitude/longitude information, optionally with an accurate local map, to the vehicle 130 that sent the address request during step 480. Finally, the searching vehicle 130 then enters the received broadcast position information into an onboard GPS and uses the GPS to navigate to the target address during step 490.

In this manner, aspects of the present invention provide resilience to imperfections in available geographic databases by allowing a user to reach a target address using the broadcast position information even when there are errors in a GPS map. The broadcast position information can optionally be employed to correct the errors in a GPS map.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 5:
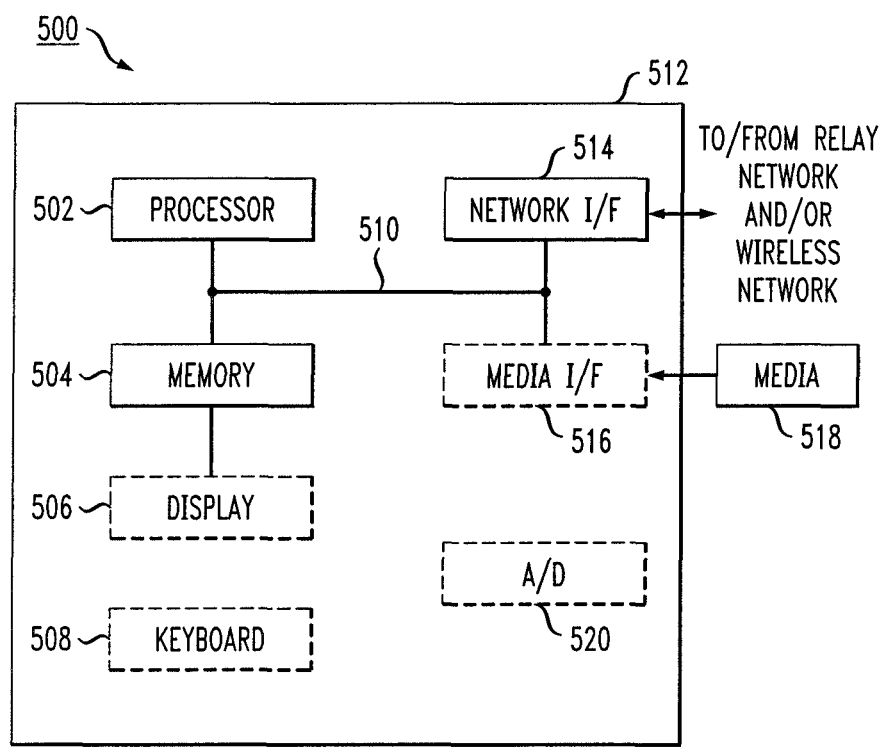
FIG. 5 depicts an exemplary navigation system that may be useful in implementing one or more aspects and/or elements of the present invention.

One or more embodiments can make use of software running on a general purpose computer or workstation. FIG. 5 depicts an exemplary navigation system 500 that may be useful in implementing one or more aspects and/or elements of the present invention. With reference to FIG. 5, such an implementation might employ, for example, a processor 502, a memory 504, and an input/output interface formed, for example, by a display 506 and a keyboard 508. The memory 504 may store, for example, code for implementing the process 300 of FIG. 3.

The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like.

In addition, the phrase "input/output interface" as used herein, is intended to include, for example, one or more mechanisms for inputting data to the processing unit (for example, a mouse), and one or more mechanisms for providing results associated with the processing unit (for example, a printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Analog-to-digital converter(s) 520 may be provided to receive analog input, such as analog video feed, and to digitize same. Such converter(s) may be interconnected with system bus 510.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times the code must be retrieved from bulk storage during implementation.

Input/output or I/O devices (including but not limited to keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 518 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Method steps described herein may be tied, for example, to a general purpose computer programmed to carry out such steps, or to hardware for carrying out such steps, as described herein. Further, method steps described herein, including, for example, obtaining data streams and encoding the streams, may also be tied to physical sensors, such as cameras or microphones, from whence the data streams are obtained.

It should be noted that any of the methods described herein can include an additional step of providing a system comprising distinct software modules embodied on a computer readable storage medium. The method steps can then be carried out using the distinct software modules and/or sub-modules of the system, as described above, executing on one or more hardware processors 502. In some cases, specialized hardware may be employed to implement one or more of the functions described here. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (AS ICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for determining a location of a target address, comprising:
   distributing one or more stationary position identifying transmitters in a vicinity of the target address, wherein the target address is a fixed location;
   upon entry of a searching vehicle in search of said target address into said vicinity of said target address, receiving position information for said target address, wherein said received position information for said target address is based upon position information transmitted by said one or more stationary position identifying transmitters located in said vicinity of the target address; and
   providing said received position information to a navigation system to obtain a navigation route to direct said searching vehicle to said target address using the received position information, wherein said transmitted position information for said target address is received by said searching vehicle indirectly from one or more nearby vehicles that individually obtain address information from said one or more stationary position identifying transmitters that the nearby vehicles come in proximity to and relay the obtained address information to passing vehicles to form a relay network, and wherein a vehicle that has obtained position information for said target address deposits said obtained position information into an address depot from which the deposited position information can be obtained by said searching vehicle.

2. The method of claim 1, further comprising the step of employing said relay network to exchange said position information with one or more other nearby vehicles using one or more of a vehicle-to-vehicle communication system and a vehicle-to-base station communication system.

3. The method of claim 1, wherein said transmitted position information for said target address comprises one or more of latitude/longitude coordinates for said target address and a localized map including said target address.

4. A method for determining a location of a target address, comprising:
   distributing one or more stationary position identifying transmitters in a vicinity of the target address, wherein the target address is a fixed location;
   upon entry of a searching vehicle in search of said target address into said vicinity of said target address, receiving position information for said target address, wherein said received position information for said target address is based upon position information transmitted by said one or more stationary position identifying transmitters located in said vicinity of the target address; and
   providing said received position information to a navigation system to obtain a navigation route to direct said searching vehicle to said target address using the received position information,
   wherein said transmitted position information for said target address is received by said searching vehicle indirectly from one or more nearby vehicles that individually obtain address information from said one or more stationary position identifying transmitters that the nearby vehicles come in proximity to and relay the obtained address information to passing vehicles to form a relay network, and
   wherein the searching vehicle first requests information about the target address from one or more passing vehicles and then only receives information from said one or more passing vehicles about the target address.

5. The method of claim 1, wherein said method is integrated into said navigation system in said searching vehicle.

6. The method of claim 1, wherein said one or more stationary position identifying transmitters is associated with one or more of a mail box, a building associated with said target address, a number tag associated with said target address, near an entrance to a neighborhood containing said target address and an Access Point associated with said target address.

7. The method of claim 1, wherein said position information for said target address is transmitted by one or more of an owner of a building associated with said target address, an association comprising said target address and the address depot.

8. The method of claim 7, wherein said address depot is populated with position information for one or more target addresses by one or more of a neighborhood association, a government entity, a highway authority, a construction company and the one or more nearby vehicles.

9. The method of claim 1, further comprising the step of storing said received position information in a circular buffer.

10. The method of claim 4, further comprising the step of employing said relay network to exchange said position information with one or more other nearby vehicles using one or more of a vehicle-to-vehicle communication system and a vehicle-to-base station communication system.

11. The method of claim 4, wherein said transmitted position information for said target address comprises one or more of latitude/longitude coordinates for said target address and a localized map including said target address.

12. The method of claim 4, wherein said method is integrated into said navigation system in said searching vehicle.

13. The method of claim 4, wherein said one or more stationary position identifying transmitters is associated with one or more of a mail box, a building associated with said target address, a number tag associated with said target address, near an entrance to a neighborhood containing said target address and an Access Point associated with said target address.

14. The method of claim 4, wherein said position information for said target address is transmitted by one or more of an owner of a building associated with said target address, an association comprising said target address and an address depot.

15. The method of claim 14, wherein said address depot is populated with position information for one or more target addresses by one or more of a neighborhood association, a government entity, a highway authority, a construction company and the one or more nearby vehicles.

16. The method of claim 4, further comprising the step of storing said received position information in a circular buffer.

17. A device for determining a location of a target address, the device comprising:
   a memory; and at least one hardware device, coupled to the memory, operative to:
      distribute one or more stationary position identifying transmitters in a vicinity of the target address, wherein the target address is a fixed location;
      upon entry of a searching vehicle in search of a target address into said vicinity of said target address, receive position information for said target address, wherein said received position information for said target address is based upon position information transmitted by said one or more stationary position identifying transmitters located in said vicinity of the target address; and
      providing said received position information to a navigation system to obtain a navigation route to direct said searching vehicle to said target address using the received position information,
      wherein said transmitted position information for said target address is received by said searching vehicle indirectly from one or more nearby vehicles that individually obtain address information from said one or more stationary position identifying transmitters that the nearby vehicles come in proximity to and relay the obtained address information to passing vehicles to form a relay network, and wherein a vehicle that has obtained position information for said target address deposits said obtained position information into an address depot from which the deposited position information can be obtained by said searching vehicle.

18. The device of claim 17, wherein said at least one hardware device is further configured to employ said relay network to exchange said position information with one or more other nearby vehicles using one or more of a vehicle-to-vehicle communication system and a vehicle-to-base station communication system.

19. The device of claim 17, wherein said transmitted position information for said target address comprises one or more of latitude/longitude coordinates for said target address and a localized map including said target address.

20. The device of claim 17, wherein said device is integrated into said navigation system in said searching vehicle.

* * * * *